United States Patent [19]

Yung

[11] Patent Number: 5,752,271
[45] Date of Patent: May 12, 1998

[54] METHOD AND APPARATUS FOR USING DOUBLE PRECISION ADDRESSABLE REGISTERS FOR SINGLE PRECISION DATA

[75] Inventor: Robert Yung, Fremont, Calif.

[73] Assignee: Sun Microsystems, Inc., Palo Alto, Calif.

[21] Appl. No.: 639,456

[22] Filed: Apr. 29, 1996

[51] Int. Cl.⁶ ................................................. G06F 12/00
[52] U.S. Cl. ................ 711/171; 395/386; 395/800.23; 395/563
[58] Field of Search ............... 395/800.23, 563, 395/386, 556, 800.43; 364/745.01; 711/171, 117

[56] References Cited

U.S. PATENT DOCUMENTS

| | | | |
|---|---|---|---|
| 4,755,965 | 7/1988 | Mary et al. | 395/550 |
| 4,823,260 | 4/1989 | Imel et al. | 395/563 |
| 5,155,820 | 10/1992 | Gibson | 395/386 |
| 5,515,520 | 5/1996 | Hatta et al. | 364/745.01 |
| 5,546,554 | 8/1996 | Yung et al. | 395/413 |
| 5,640,588 | 6/1997 | Vegesna et al. | 395/800.23 |

*Primary Examiner*—Larry D. Donaghue
*Attorney, Agent, or Firm*—Townsend and Townsend and Crew LLP

[57] ABSTRACT

Utilizing a register file only addressable as double precision registers for part of the register file for storing single precision register results. In particular, groups of data in addressable single precision registers are written as pairs using the double precision register address in the double precision register file. Subsequently, the same data can be written back to where they can be accessed as single precision data.

20 Claims, 3 Drawing Sheets

Single-Precision Floating-Point Registers, with Aliasing

| Operand register ID | Operand from |
|---|---|
| f31 | f31<31:0> |
| f30 | f30<31:0> |
| f29 | f29<31:0> |
| f28 | f28<31:0> |
| f27 | f27<31:0> |
| f26 | f26<31:0> |
| f25 | f25<31:0> |
| f24 | f24<31:0> |
| f23 | f23<31:0> |
| f22 | f22<31:0> |
| f21 | f21<31:0> |
| f20 | f20<31:0> |
| f19 | f19<31:0> |
| f18 | f18<31:0> |
| f17 | f17<31:0> |
| f16 | f16<31:0> |
| f15 | f15<31:0> |
| f14 | f14<31:0> |
| f13 | f13<31:0> |
| f12 | f12<31:0> |
| f11 | f11<31:0> |
| f10 | f10<31:0> |
| f9 | f9<31:0> |
| f8 | f8<31:0> |
| f7 | f7<31:0> |
| f6 | f6<31:0> |
| f5 | f5<31:0> |
| f4 | f4<31:0> |
| f3 | f3<31:0> |
| f2 | f2<31:0> |
| f1 | f1<31:0> |
| f0 | f0<31:0> |

Single-Precision Floating-Point Registers, with Aliasing

| Operand register ID | Operand from |
|---|---|
| f31 | f31<31:0> |
| f30 | f30<31:0> |
| f29 | f29<31:0> |
| f28 | f28<31:0> |
| f27 | f27<31:0> |
| f26 | f26<31:0> |
| f25 | f25<31:0> |
| f24 | f24<31:0> |
| f23 | f23<31:0> |
| f22 | f22<31:0> |
| f21 | f21<31:0> |
| f20 | f20<31:0> |
| f19 | f19<31:0> |
| f18 | f18<31:0> |
| f17 | f17<31:0> |
| f16 | f16<31:0> |
| f15 | f15<31:0> |
| f14 | f14<31:0> |
| f13 | f13<31:0> |
| f12 | f12<31:0> |
| f11 | f11<31:0> |
| f10 | f10<31:0> |
| f9 | f9<31:0> |
| f8 | f8<31:0> |
| f7 | f7<31:0> |
| f6 | f6<31:0> |
| f5 | f5<31:0> |
| f4 | f4<31:0> |
| f3 | f3<31:0> |
| f2 | f2<31:0> |
| f1 | f1<31:0> |
| f0 | f0<31:0> |

FIG. 3

Double-Precision Floating-Point Registers, with Aliasing

| Operand register ID | Operand field | From register |
|---|---|---|
| f62 | <63:0> | f62<63:0> |
| f60 | <63:0> | f60<63:0> |
| f58 | <63:0> | f58<63:0> |
| f56 | <63:0> | f56<63:0> |
| f54 | <63:0> | f54<63:0> |
| f52 | <63:0> | f52<63:0> |
| f50 | <63:0> | f50<63:0> |
| f48 | <63:0> | f48<63:0> |
| f46 | <63:0> | f46<63:0> |
| f44 | <63:0> | f44<63:0> |
| f42 | <63:0> | f42<63:0> |
| f40 | <63:0> | f40<63:0> |
| f38 | <63:0> | f38<63:0> |
| f36 | <63:0> | f36<63:0> |
| f34 | <63:0> | f34<63:0> |
| f32 | <63:0> | f32<63:0> |
| f30 | <31:0><br><63:32> | f31<31:0><br>f30<31:0> |
| f28 | <31:0><br><63:32> | f29<31:0><br>f28<31:0> |
| f26 | <31:0><br><63:32> | f27<31:0><br>f26<31:0> |
| f24 | <31:0><br><63:32> | f25<31:0><br>f24<31:0> |
| f22 | <31:0><br><63:32> | f23<31:0><br>f22<31:0> |
| f20 | <31:0><br><63:32> | f21<31:0><br>f20<31:0> |
| f18 | <31:0><br><63:32> | f19<31:0><br>f18<31:0> |
| f16 | <31:0><br><63:32> | f17<31:0><br>f16<31:0> |
| f14 | <31:0><br><63:32> | f15<31:0><br>f14<31:0> |
| f12 | <31:0><br><63:32> | f13<31:0><br>f12<31:0> |
| f10 | <31:0><br><63:32> | f11<31:0><br>f10<31:0> |
| f8 | <31:0><br><63:32> | f9<31:0><br>f8<31:0> |
| f6 | <31:0><br><63:32> | f7<31:0><br>f6<31:0> |
| f4 | <31:0><br><63:32> | f5<31:0><br>f4<31:0> |
| f2 | <31:0><br><63:32> | f3<31:0><br>f2<31:0> |
| f0 | <31:0><br><63:32> | f1<31:0><br>f0<31:0> |

FIG. 4

METHOD AND APPARATUS FOR USING DOUBLE PRECISION ADDRESSABLE REGISTERS FOR SINGLE PRECISION DATA

BACKGROUND OF THE INVENTION

The present invention relates to microprocessors with register files, and in particular to floating point register files with single precision and double precision registers.

In a microprocessor, a number of registers are provided for use by the execution logic of the microprocessor. In a superscalar design, for instance, multiple execution units are provided which may share a single register file. Separate register files may be provided for integer and floating point operations.

In the SPARC Version 8 instruction set of SPARC International, Inc. (Sparc V.8) for instance, 32 single precision registers are provided in the floating point register file. These 32 registers can also be addressed as 16 double precision floating point registers. The opcode field for identifying registers in the SuperSparc™ design has 5 bits, allowing it to specify a register designation from zero to 31.

In the SPARC Version 9 instruction set of SPARC International, Inc. (Sparc V.9), an additional 16 double precision floating point registers were added. The original Sparc V.9 floating point registers were designated as either single precision registers 0–31 or double precision registers 0, 2, . . . 30. Every even single precision register could be used to designate a double precision register. In the Sparc V.9, the additional 16 double precision registers were designated as 1, 3, . . . 31, using the odd double precision designations not used on the original Sparc V.8 register file. This gives a total of 32 addressable double precision floating point registers. However, in the upper portion of the register file, double precision registers 1, 3, . . . 31, are only addressable as double precision registers, and not single precision registers. This is because not enough bits in the opcode are available to identify 64 register positions, only 32, which are used up entirely in addressing the 32 single precision registers in the lower portion of the floating point register file.

When using a microprocessor to process graphical information or pixel data, the pixel data are often present in arrays. An operation such as adding a scalar to an array could use up many registers. All 32 registers in the entire register file may not be enough, requiring that the register contents be written to memory, and subsequently recovered, adding to the number of cycles required to complete the operation. It would be desirable to have more registers without requiring additional addressing bits for the register file.

SUMMARY OF THE INVENTION

The present invention provides a method and apparatus for utilizing a register file only addressable as double precision registers for storing single precision register results. In particular, groups of data in addressable single precision registers are written as pairs using the double precision register address in the double precision register file. Subsequently, the same data can be written back to where they can be accessed as single precision data.

In a preferred embodiment, the register files are the lower and upper portion of a floating point register file. The lower portion is addressable as either single or double precision, while the upper portion can be addressed only as double precision. In order to provide a register-to-register operation which can move the data from the lower to the upper portion of the register file and vice versa, a move operation can be used, since such move operations allow both the source and destination to be a register in the register file. The move operation uses a double precision source register in the lower half of the register file and a double precision destination register in the upper half. The move operation can also be a logical OR AND operation of the data with itself, resulting in the same data being stored without modification, thus using the operator as a move instruction. Subsequently, the data can be retrieved with the same type of move operation. When retrieved, the data can be operated upon again in either the single or double precision format.

The present invention thus saves memory cycles for certain operations, such as vector, floating point and pixel array operations, by providing that the data can be operated upon and then stored in the upper portion of the register file. With the additional space of the upper portion of the register file available, there is no need to write to memory because of a lack of spare registers, thus eliminating the additional cycle latency of a store and retrieval from memory.

For a fuller understanding of the nature and advantages of the invention, reference should be made to the following description taken in conjunction with the accompanying drawings.

BRIEF DESCRIPTION OF THE DRAWINGS

FIG. 3 is a table of the single precision register file designations; and

FIG. 4 is a table of the single and double precision register designations for a floating point register file according to one embodiment of the present invention.

DESCRIPTION OF THE PREFERRED EMBODIMENT

Figure 1:
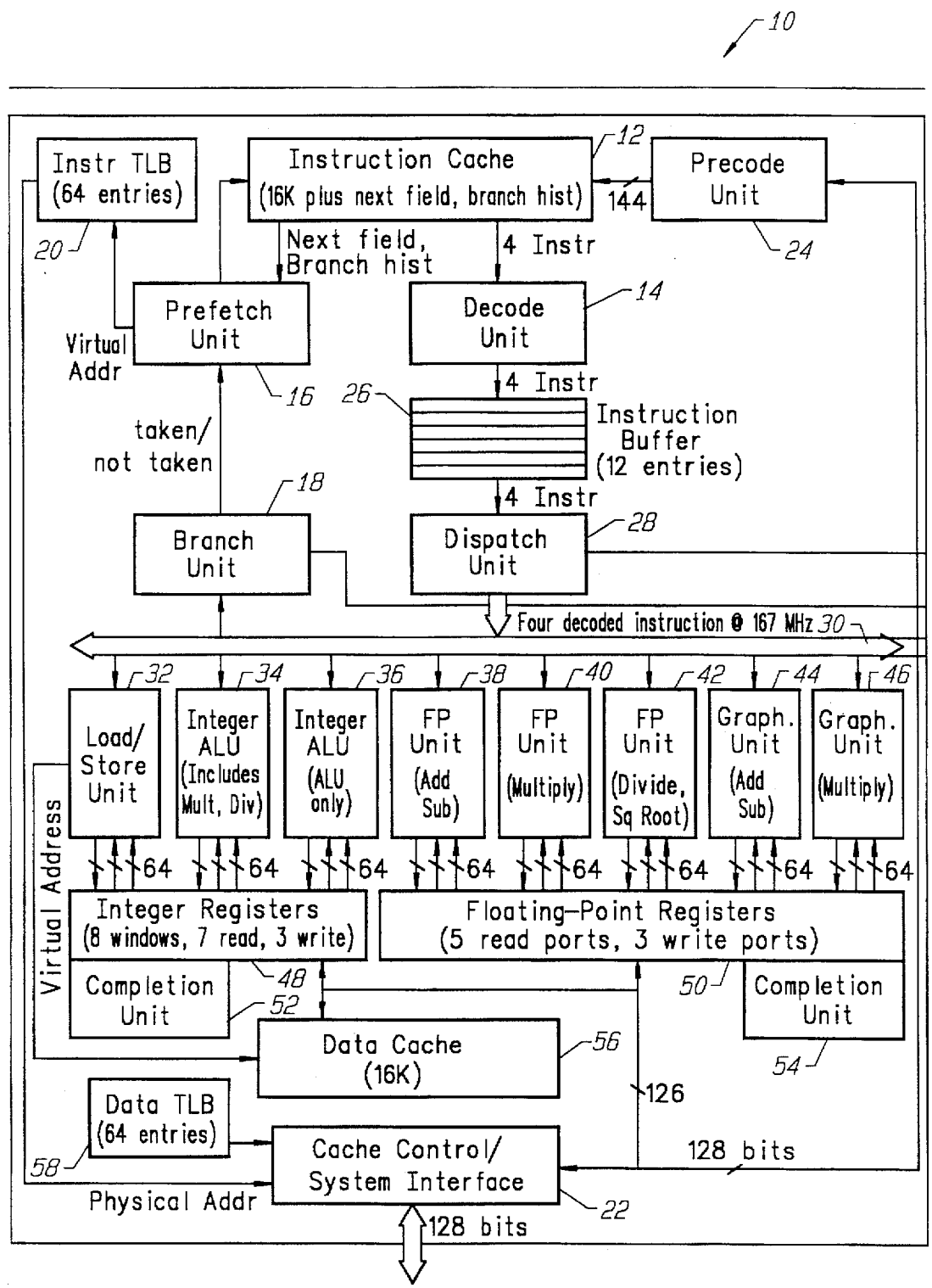
FIG. 1 is a block diagram of one embodiment of a processor which can be modified to incorporate the present invention.

FIG. 1 is a block diagram of an UltraSparc™ microprocessor 10, modified to incorporate the present invention. An instruction cache 12 provides instructions to a decode unit 14. The instruction cache can receive its instructions from a prefetch unit 16, which either receives instructions from branch unit 18 or provides a virtual address to an instruction TLB (translation look-aside buffer) 20, which then causes the instructions to be fetched from an off-chip cache through a cache control/system interface 22. The instructions from the off-chip cache are provided to a pre-decode unit 24 to provide certain information, such as whether it is a branch instruction, to instruction cache 12.

Instructions from decode unit 14 are provided to an instruction buffer 26, where they are accessed by dispatch unit 28. Dispatch unit 28 will provide four decoded instructions at a time along a bus 30, each instruction being provided to one of eight functional units 32–46. The dispatch unit will dispatch four such instructions each cycle, subject to checking for data dependencies and availability of the proper functional unit.

The first three functional units, the load/store unit 32 and the two integer ALU units 34 and 36, share a set of integer registers 48. Floating-point registers 50 are shared by floating point units 38, 40 and 42 and graphical units 44 and 46. Each of the integer and floating point functional unit groups have a corresponding completion unit, 52 and 54, respectively. The microprocessor also includes an on-chip data cache 56 and a data TLB 58.

Figure 2:
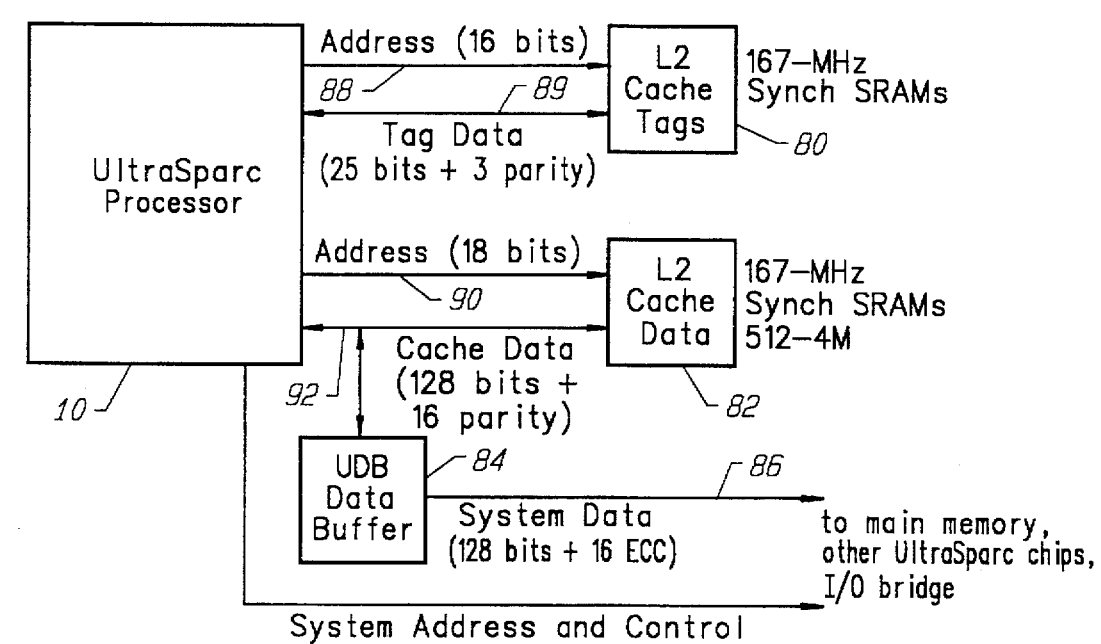
FIG. 2 is a block diagram of a system incorporating the processor of FIG. 1.

FIG. 2 is a block diagram of a chipset including processor 10 of FIG. 1. Also shown are L2 cache tags memory 80, and L2 cache data memory 82. In addition, a data buffer 84 for connecting to the system data bus 86 is shown. In the example shown, a 16-bit address bus 88 connects between processor 10 and tag memory 80, with the tag data being provided on a 28-bit tag data bus 89. An 18-bit address bus 90 connects to the data cache 82, with a 144 bit data bus 92 to read or write cache data.

FIG. 3 illustrates the designations of single precision registers as f0–f31 in a floating point register file, such as floating point register file 50 of FIG. 1. The number of bits available to represent the register ID is 5, allowing a designation from 0–31.

FIG. 4 illustrates a register file used in a preferred embodiment in the invention, in which the floating point register designations are shown extending from 0–30 in a lower half 100 and from 1–31 in an upper half 102. Each double precision register in lower half 100 corresponds to two single precision registers as indicated. In the upper half 102, on the other hand, only the double precision register portion is addressable, with the single precision components not being separately addressable. Alternately, the single precision registers could be in the upper half, or any other portion of the register file. Also, more or less than half the registers could be single precision.

The present invention provides more usable single precision registers in a SPARC floating point register file with no additional address bits in the opcode. The register contents of some or all of lower half 100 being temporarily stored in the upper half 102, and subsequently retrieved into lower half 100. With the single precision registers of lower half 100 being used initially, these same register contents can be written to the upper half 100 in a block or in pairs using the double precision register designation. Thus, although the single precision components cannot be operated on out of half 102, they can be written there in pairs or blocks, and subsequently retrieved in pairs or blocks, allowing storage in the upper half without requiring a separate store to memory.

In some processors, there is not a move operation which allows storing from one portion of the register file to another portion of the register file. Accordingly, the transfer of data from one register to another can be accomplished by using a logical operation (such as an OR AND of the data with itself), which does allow a logical operation on a register to be stored in a different register as opposed to main memory.

In one example, the logical operation can be an OR of the data in the source register (from lower half 100) with itself, with the destination register being in upper half 102. An OR of data with itself will not change the data, and thus the same data ends up being written into the appropriate register in upper half 102. Similarly, an AND of the source data with itself can be used to transfer the data from one register to another.

Attached as Appendix 1 is an example of an instruction sequence using the present invention.

In addition to single and double precision, quad precision could be used and is supported by the Sparc V.9, for instance. Thus, after the single precision data is operated upon, it could be moved using the quad precision destinations in the upper half. Alternately, double precision data could be operated on, and moved using the quad precision designations.

As will be understood by those of skill in the art, the present invention may be embodied in other specific forms without departing from the spirit or essential characteristics thereof. Accordingly, the foregoing description is intended to be illustrative of, but not limiting, of the scope of the invention, which is set forth in the following claims.

APPENDIX 1

```
Operations is A * B + C -> C;
in pseudo-assembly code:
for (i = 0; i < 1024; i += 8) {
    for (j = 0; j < 1024; j += 8) {
        load arrayA[0] -> reg[0]
        load arrayB[0] -> reg[8]
        load arrayC[0] -> reg[16]
        reg[0] * reg[8] -> reg[0];
        reg[0] + reg[16] -> reg[0];
        store reg[0] -> arrayC[j];
        <repeat [load, op, store] 7 times>
    }
}
=> software unroll to minimize cache miss latency.
   Ecache has 7 cycles latency
   The following code are shown for clarity and
   can be better scheduled when some load, op, store
   are intermixed.
for (i = 0; i < 1024; i += 8) {
    for (j = 0; j < 1024; j += 8) {
        load arrayA[i] -> reg[0]
        load arrayB[j] -> reg[8]
        load arrayC[j] -> reg[16]
        load arrayA[i+1] -> reg[1]
        load arrayB[j+1] -> reg[9]
        load arrayC[j+1] -> reg[17]
        load arrayA[i+2] -> reg[2]
        load arrayB[j+2] -> reg[10]
        load arrayC[j+2] -> reg[18]
        load arrayA[i+3] -> reg[3]
        load arrayB[j+3] -> reg[11]
        load arrayC[j+3] -> reg[19]
        load arrayA[i+4] -> reg[4]
        load arrayB[j+4] -> reg[12]
        load arrayC[j+4] -> reg[20]
        load arrayA[i+5] -> reg[5]
        load arrayB[j+5] -> reg[13]
        load arrayC[j+5] -> reg[21]
        load arrayA[i+6] -> reg[6]
        load arrayB[j+6] -> reg[14]
        load arrayC[j+6] -> reg[22]
        load arrayA[i+7] -> reg[7]
        load arrayB[j+7] -> reg[15]
        load arrayC[j+7] -> reg[23]
        reg[0] * reg[8] -> reg[0];
        reg[0] + reg[16] -> reg[0];
        reg[1] * reg[9] -> reg[1];
        reg[1] + reg[17] -> reg[1];
        reg[2] * reg[10] -> reg[2];
        reg[2] + reg[18] -> reg[2];
        reg[3] * reg[11] -> reg[3];
        reg[3] + reg[19] -> reg[3];
        reg[4] * reg[12] -> reg[4];
        reg[4] + reg[20] -> reg[4];
        reg[5] * reg[13] -> reg[5];
        reg[5] + reg[21] -> reg[5];
        reg[6] * reg[14] -> reg[6];
        reg[6] + reg[22] -> reg[6];
        reg[7] * reg[15] -> reg[7];
        reg[7] + reg[23] -> reg[7];
        store reg[0] -> arrayC[j];
        store reg[1] -> arrayC[j+1];
        store reg[2] -> arrayC[j+2];
        store reg[3] -> arrayC[j+3];
        store reg[4] -> arrayC[j+4];
        store reg[5] -> arrayC[j+5];
        store reg[6] -> arrayC[j+6];
        store reg[7] -> arrayC[j+7];
    }
}
=> with double banking to eliminate loads
   there are most likely fewer load/store resources than
   datapath (move) in a cpu.
```

-continued

APPENDIX 1

```
dmov: double move between lower <-> upper FP reg banks.
for (i = 0; i < 1024; i += 8) {
    load arrayA[i]   -> reg[0]
    load arrayA[i+1] -> reg[1]
    load arrayA[i+2] -> reg[2]
    load arrayA[i+3] -> reg[3]
    load arrayA[i+4] -> reg[4]
    load arrayA[i+5] -> reg[5]
    load arrayA[i+6] -> reg[6]
    load arrayA[i+7] -> reg[7]
    dmov reg[0] -> reg[32];
    dmov reg[2] -> reg[34];
    dmov reg[4] -> reg[36];
    dmov reg[6] -> reg[38];
    for (j = 0; j < 1024; j += 8) {
        dmov reg[32] -> reg[0]
        load arrayB[j]   -> reg[8]
        load arrayC[j]   -> reg[16]
        load arrayB[j+1] -> reg[9]
        load arrayC[j+1] -> reg[17]
        dmov reg[34] -> reg[2]
        load arrayB[j+2] -> reg[10]
        load arrayC[j+2] -> reg[18]
        load arrayB[j+3] -> reg[11]
        load arrayC[j+3] -> reg[19]
        dmov reg[36] -> reg[4]
        load arrayB[j+4] -> reg[12]
        load arrayC[j+4] -> reg[20]
        load arrayB[j+5] -> reg[13]
        load arrayC[j+5] -> reg[21]
        dmov reg[38] -> reg[6]
        load arrayB[j+6] -> reg[14]
        load arrayC[j+6] -> reg[22]
        load arrayB[j+7] -> reg[15]
        load arrayC[j+7] -> reg[23]
        reg[0] * reg[8]  -> reg[0];
        reg[0] + reg[16] -> reg[0];
        reg[1] * reg[9]  -> reg[1];
        reg[1] + reg[17] -> reg[1];
        reg[2] * reg[10] -> reg[2];
        reg[2] + reg[18] -> reg[2];
        reg[3] * reg[11] -> reg[3];
        reg[3] + reg[19] -> reg[3];
        reg[4] * reg[12] -> reg[4];
        reg[4] + reg[20] -> reg[4];
        reg[5] * reg[13] -> reg[5];
        reg[5] + reg[21] -> reg[5];
        reg[6] * reg[14] -> reg[6];
        reg[6] + reg[22] -> reg[6];
        reg[7] * reg[15] -> reg[7];
        reg[7] + reg[23] -> reg[7];
        store reg[0] -> arrayC[j];
        store reg[1] -> arrayC[j+1];
        store reg[2] -> arrayC[j+2];
        store reg[3] -> arrayC[j+3];
        store reg[4] -> arrayC[j+4];
        store reg[5] -> arrayC[j+5];
        store reg[6] -> arrayC[j+6];
        store reg[7] -> arrayC[j+7];
    }
}
```

What is claimed is:

1. In a microprocessor having a first register file having a plurality of registers, each register being addressable as at least two single precision registers or as one double precision register, and a second register file having a plurality of registers addressable only as double precision registers and not as single precision registers, a method comprising the steps of:

writing single precision data to at least a first single precision register in said first register file;

storing the contents of a first double precision register containing said first single precision register to a second double precision register in said second register file; and subsequently storing the contents of said second double precision register file back into said first register file.

2. The method of claim 1 wherein said first and second register files are part of a floating point register file.

3. The method of claim 1 wherein said writing and storing steps are block writing and storing steps, each block having a plurality of double precision registers.

4. The method of claim 1 wherein said registers are addressed as quad precision registers in at least one of said storing steps.

5. The method of claim 1 wherein at least one of said storing instructions comprises the steps of performing a move operation which does not modify the data contents of said registers.

6. The method of claim 5 wherein said move operation is a logical operation.

7. The method of claim 6 wherein said logical operation comprises an OR of said register contents with itself.

8. The method of claim 6 wherein said logical operation comprises an AND of said register contents with itself.

9. In a microprocessor having a floating point register file with a lower portion of said register file having a plurality of registers, each register being addressable as at least two single precision registers or as one double precision register, and an upper portion of said register file, having a plurality of registers addressable only as double precision registers and not as single precision registers, a method comprising the steps of:

writing single precision data to a block of first single precision registers in said lower portion of said register file;

performing a move operation on said block of data, and writing the results in said upper portion of said register file; and subsequently moving a portion of the contents of second upper portion of said register file back into said first register file.

10. The method of claim 9 wherein said move operation comprises a logical OR of said register contents with itself.

11. The method of claim 9 wherein said move operation comprises a logical AND of said register contents with itself.

12. A microprocessor comprising:

a first register file having a plurality of registers, each register being addressable as at least two single precision registers or as one double precision register;

a second register file having a plurality of registers addressable only as double precision registers and not as single precision registers; and a memory storing a plurality of instructions for execution by said microprocessor, said instructions including writing single precision data to at least a first single precision register in said first register file, moving the contents of a first double precision register containing said first single precision register to a second double precision register in said second register file, and subsequently moving the contents of said second double precision register back into said first register file.

13. The microprocessor of claim 12 wherein at least one of said moving instructions comprises the steps of performing a logical operation which does not modify the data contents of said registers.

14. The microprocessor of claim 13 wherein said logical operation comprises an OR of said register contents with itself.

15. The microprocessor of claim 13 wherein said logical operation comprises an AND of said register contents with itself.

16. A computer system comprising:

main memory;

a microprocessor coupled to said main memory, said microprocessor including a first register file having a plurality of registers, each register being addressable as at least two single precision registers or as one double precision register;

a second register file having a plurality of registers addressable only as double precision registers and not as single precision registers; and an instruction memory storing a plurality of instructions for execution by said microprocessor, said instructions including writing single precision data to at least a first single precision register in said first register file, moving the contents of a first double precision register containing said first single precision register to a second double precision register in said second register file, and subsequently moving the contents of said second double precision register back into said first register file.

17. The computer system of claim 16 wherein said instruction memory is part of said main memory.

18. The computer system of claim 16 wherein said instruction memory is a cache memory.

19. The computer system of claim 16 wherein at least one of said moving instructions comprises the steps of performing a logical operation which does not modify the data contents of said registers.

20. The computer system of claim 19 wherein said logical operation comprises an OR of said register contents with itself.

* * * * *